US011144571B2

(12) United States Patent
Sato

(10) Patent No.: US 11,144,571 B2
(45) Date of Patent: Oct. 12, 2021

(54) SERVER APPARATUS, CLIENT APPARATUS, INFORMATION PROCESSING METHOD, AND RECORDING MEDIUM FOR ACQUISITION OF UPDATED DATA ON SETTING INFORMATION ABOUT A CLIENT APPARATUS

(71) Applicant: CANON KABUSHIKI KAISHA, Tokyo (JP)

(72) Inventor: Shogo Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 271 days.

(21) Appl. No.: 15/904,010

(22) Filed: Feb. 23, 2018

(65) Prior Publication Data

US 2018/0253482 A1 Sep. 6, 2018

(30) Foreign Application Priority Data

Mar. 6, 2017 (JP) .............................. JP2017-041866

(51) Int. Cl.
*G06F 16/27* (2019.01)
*G06F 12/0875* (2016.01)
(Continued)

(52) U.S. Cl.
CPC .......... *G06F 16/27* (2019.01); *G06F 12/0875* (2013.01); *G06F 12/1458* (2013.01);
(Continued)

(58) Field of Classification Search
CPC .. G06F 16/27; G06F 16/1847; G06F 12/0875; G06F 12/1458; G06F 2212/2024; H04L 63/0876
(Continued)

(56) References Cited

U.S. PATENT DOCUMENTS 6,463,474 B1 * 10/2002 Fuh ..................... H04L 63/0227
709/225
8,756,694 B2 * 6/2014 Plante ................. H04L 63/1441
726/25

(Continued)

FOREIGN PATENT DOCUMENTS

| JP | 2005-258633 A | 9/2005 |
|---|---|---|
| JP | 2015-121989 A | 7/2015 |
| JP | 2016-082334 A | 5/2016 |

OTHER PUBLICATIONS

Wikipedia contributors. (Jun. 30, 2015). File server. In Wikipedia, The Free Encyclopedia. Retrieved Dec. 31, 2019, from https://en.wikipedia.org/w/index.php?title=File_server&oldid=669314132 (Year: 2015).*

(Continued)

*Primary Examiner* — Robert W Beausoliel, Jr.
*Assistant Examiner* — Arthur Ganger
(74) *Attorney, Agent, or Firm* — Canon U.S.A., Inc. IP Division

(57) ABSTRACT

A server apparatus includes a reception unit that receives, from a client apparatus, an updated data acquisition request for acquisition of updated data on setting information about the client apparatus that is stored in a non-volatile storage device of the server apparatus, a generation unit that generates data indicating that the updated data does not exist without accessing the non-volatile storage device in a case where identification information for identifying the client apparatus that transmitted the updated data acquisition request is included in an identification information list of a client to which an updated data response has been transmitted, the identification information list being stored in a cache memory, and a response unit that transmits to the client (Continued)

apparatus a response with the generated data indicating that the updated data does not exist.

15 Claims, 13 Drawing Sheets

(51) Int. Cl.
  *G06F 12/14* (2006.01)
  *H04L 29/06* (2006.01)
  *G06F 16/18* (2019.01)
(52) U.S. Cl.
  CPC ...... *G06F 16/1847* (2019.01); *H04L 63/0876* (2013.01); *G06F 2212/2024* (2013.01)
(58) Field of Classification Search
  USPC ........................................................ 707/610
  See application file for complete search history.

(56) References Cited

U.S. PATENT DOCUMENTS

| | | | | |
|---|---|---|---|---|
| 2004/0167926 | A1* | 8/2004 | Waxman | G06F 21/10 |
| 2005/0039054 | A1* | 2/2005 | Satoh | H04L 63/0815 |
| | | | | 726/4 |
| 2014/0006951 | A1* | 1/2014 | Hunter | H04H 60/31 |
| | | | | 715/719 |
| 2017/0212680 | A1* | 7/2017 | Waghulde | G06F 16/185 |

OTHER PUBLICATIONS

Linux Page Cache Basics. Thomas-Krenn Wiki. Published Feb. 8, 2013. Accessed Dec. 31, 2019 from <https://www.thomas-krenn.com/en/wikiEN/index.php?title=Linux_Page_Cache_Basics&oldid=1273> (Year: 2013).*

* cited by examiner

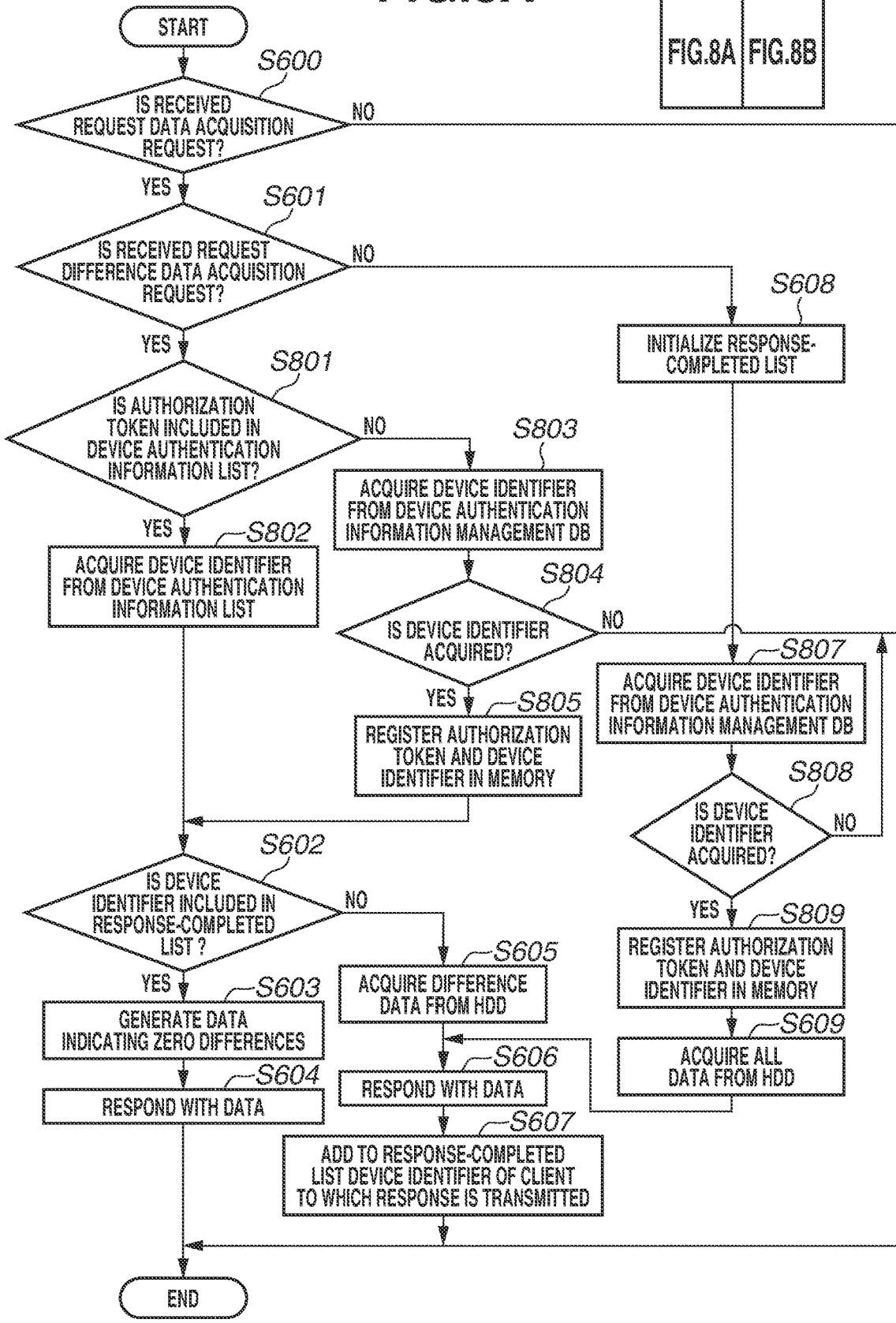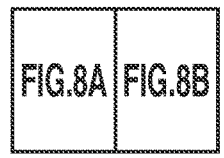

SERVER APPARATUS, CLIENT APPARATUS, INFORMATION PROCESSING METHOD, AND RECORDING MEDIUM FOR ACQUISITION OF UPDATED DATA ON SETTING INFORMATION ABOUT A CLIENT APPARATUS

BACKGROUND

Field

The present disclosure relates to a server apparatus, a client apparatus, an information processing method, and a recording medium.

Description of the Related Art

Recent information processing apparatuses such as a multi-function peripheral (MFP) include a non-volatile medium such as a hard disk drive (HDD) to store device data. There are cases in which a MFP is used as a server for synchronization with setting values of other MFPs and management of the setting values, as discussed in Japanese Patent Application Laid-Open No. 2015-121989. In the case discussed in Japanese Patent Application Laid-Open No. 2015-121989, a data acquisition request is constantly made by a plurality of MFPs operating as clients. In this case, each time a data acquisition request is made, access to an HDD of the MFP operating as the server is made. This can result in the lifetime of the HDD of the MFP operating as the server coming to an end earlier than HDDs of other MFPs that do not operate as a server.

Techniques for reducing the access load on HDDs have been discussed. Japanese Patent Application Laid-Open No. 2005-258633 discusses a technique in which access to a HDD with a higher failure incidence than those of other HDDs is restricted using a cache memory. At the time of reading data, if the data to be read is in the HDD with a high failure incidence, a disk array controller discussed in Japanese Patent Application Laid-Open No. 2005-258633 determines whether the data to be read is in a cache memory. If the data to be read is in the cache memory, the disk array controller reads the data from the cache memory. If the data to be read is not in the cache memory, the disk array controller reads the data from the HDD and writes the same data to the cache memory. At the time of writing data, the disk array controller does not write the data to the HDD with a high failure incidence, but writes the data to the cache. The disk array controller writes the data of the cache memory to the HDD before the data stored in the cache memory is cleared.

In the technique discussed in Japanese Patent Application Laid-Open No. 2005-258633, a single apparatus includes a plurality of HDDs to reduce the use of the HDD with a higher failure incidence than those of the other HDDs. In the technique discussed in Japanese Patent Application Laid-Open No. 2005-258633, if the failure incidence of a HDD becomes high, the cache memory is used in place of the HDD.

The technique discussed in Japanese Patent Application Laid-Open No. 2005-258633 does not consider a method of reducing access to the HDDs before the failure incidence increases.

SUMMARY

According to an aspect of the present disclosure, a server apparatus includes a memory device that stores a set of instructions, and at least one processor that executes the set of instructions to receive, from a client apparatus, an updated data acquisition request for acquisition of updated data on setting information about the client apparatus that is stored in a non-volatile storage device of the server apparatus, generate data indicating that the updated data does not exist without accessing the non-volatile storage device in a case where identification information for identifying the client apparatus that transmitted the updated data acquisition request is included in an identification information list of a client to which an updated data response has been transmitted, the identification information list being stored in a cache memory, and transmit to the client apparatus a response with the generated data indicating that the updated data does not exist.

Further features will become apparent from the following description of exemplary embodiments with reference to the attached drawings.

BRIEF DESCRIPTION OF THE DRAWINGS

FIGS. 8A and 8B, collectively FIG. 8, are a flowchart illustrating an example of information processing which is executed by the setting value management server.

DESCRIPTION OF THE EMBODIMENTS

Various exemplary embodiments will be described below with reference to the drawings.

Figure 1:
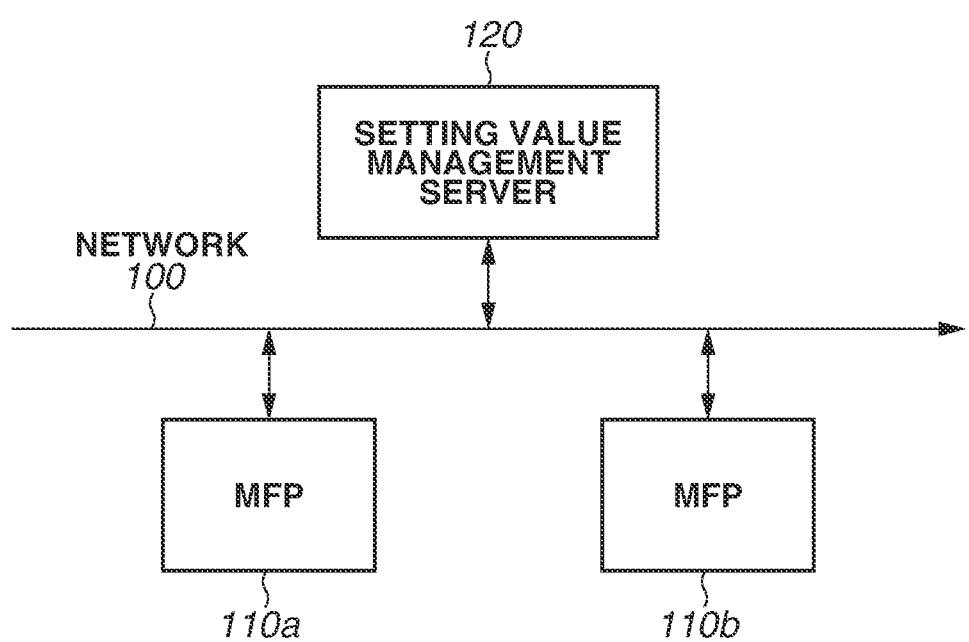
FIG. 1 illustrates an example of a system configuration of a setting value synchronization system.

A first exemplary embodiment will be described below. FIG. 1 illustrates an example of a system configuration of a setting value synchronization system. Multi-functional peripherals (MFPs) 110a and 110b and a setting value management server 120 are connected to a network 100. The setting value management server 120 manages the setting values of the MFPs 110a and 110b and includes the function of reflecting in the MFPs 110a and 110b the setting values stored on a server. The MFPs 110a and 110b each function as a client with respect to the setting value management server 120. The setting value management server 120 is an example of a server apparatus and a computer. The MFPs 110a and 110b are examples of a client apparatus and a computer.

The function of the setting value management server 120 can be located in the MFPs 110a and 110b. In this case, the setting value management server 120 as a hardware configuration is not included.

Details of the setting value management server 120 and the MFPs 110a and 110b will be described below. The MFPs 110a and 110b will collectively be referred to as MFP 110, where MFP 110 can be either of the MFPs 110a and 110b. The MFP 110 is an example of an image forming apparatus.

The MFP 110 is a device that realizes a plurality of types of functions (copy, facsimile, etc.) and stores therein setting values for use in executing the functions. If a change is made to the setting values, the MFP 110 notifies the setting value management server 120 of change information via the network 100. If setting value change information is received on the setting value management server 120, the MFP 110 changes the setting value of the MFP 110. The setting values managed by the setting value management server 120 include a device setting value and a user setting value.

The device setting value is a setting value that is used for the MFPs 110a and 110b to operate, whereas the user setting value is a setting value for use by the user. The user setting value includes a user-shared setting value and a user-specific setting value. The user-shared setting value is a shared setting value that is used by all users. The user-specific setting value is a setting value separately set for each user.

If a change is made to the setting values on the setting value management server 120, a notification of setting value change information is transmitted to both the MFPs 110a and 110b. If a change is made to the setting value of one of the MFPs 110a and 110b, a notification of change information is first transmitted to the setting value management server 120 and thereafter transmitted to the other MFP 110 via the setting value management server 120.

Figure 2:
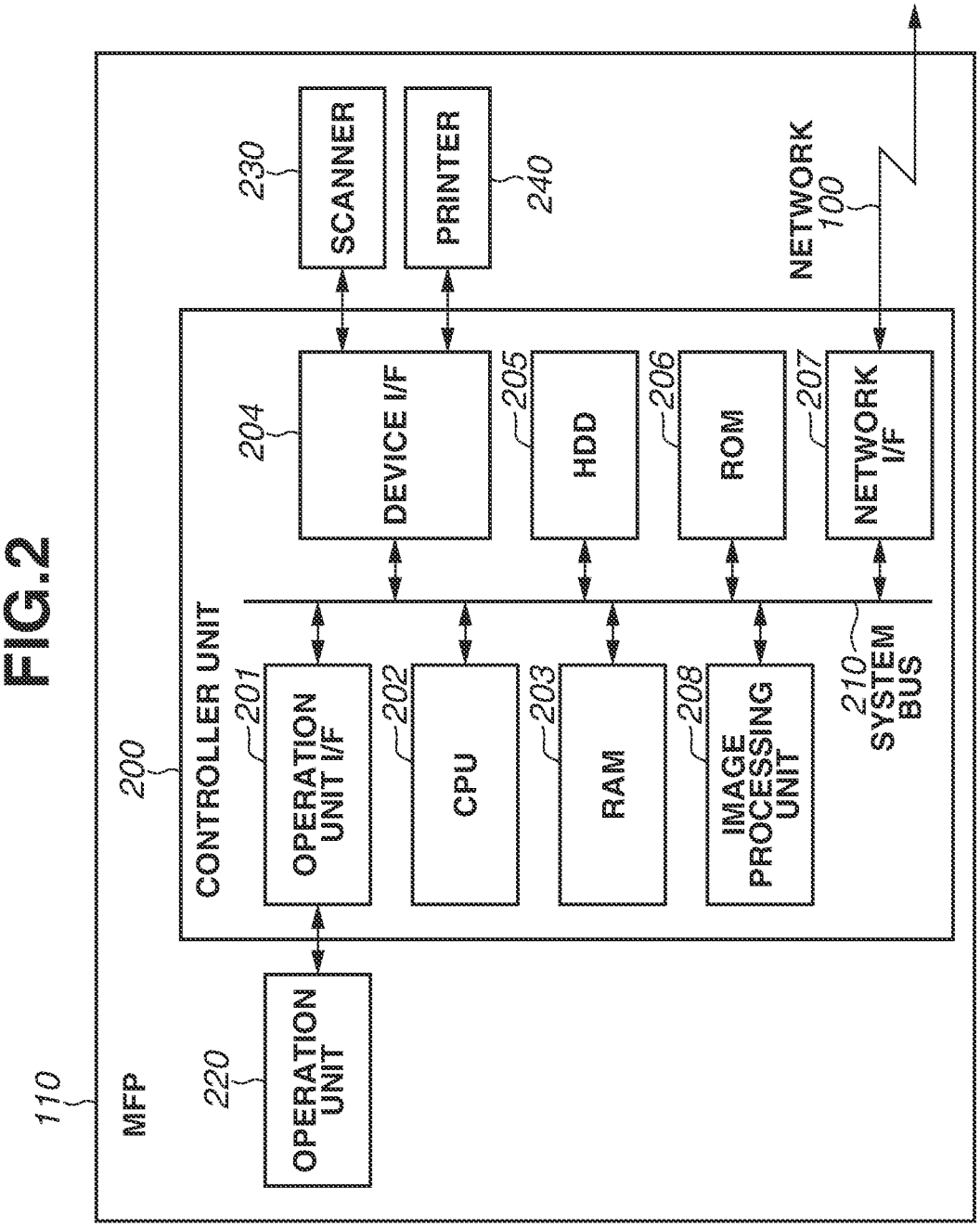
FIG. 2 illustrates an example of a hardware configuration of a multi-function peripheral (MFP).

FIG. 2 illustrates an example of a hardware configuration of the MFP 110. The MFP 110 includes a controller unit 200, an operation unit 220, a scanner 230, and a printer 240.

The controller unit 200 includes a central processing unit (CPU) 202. The CPU 202 activates an operating system (OS) using a boot program stored in a read-only memory (ROM) 206. The controller unit 200 executes the OS an application program stored in a hard disk drive (HDD) 205 to thereby execute various types of processing. A random-access memory (RAM) 203 is used as a work area of the CPU 202. The HDD 205 stores the application program and various types of data. The RAM 203 is an example of a cache memory of the MFP 110. The HDD 205 is an example of a storage device of the MFP 110.

An operation unit interface (I/F) 201, a device I/F 204, a network I/F 207, an image processing unit 208, he RAM 203, and the ROM 206 are connected to the CPU 202 via a system bus 210.

The operation unit I/F 201 is an interface between the controller unit 200 and the operation unit 220, and can include a touch panel. The operation unit I/F 201 transmits information such as various types of data to be displayed in the operation unit 220 and transmits user input information to the CPU 202. A scanner 230 and a printer 240 are connected to the device I/F 204, and input and output of data and control signals are performed. The network I/F 207 is connected to the network 100 to perform input and output via the network 100 between the setting value management server 120 and the MFP 110 on the network 100. The image processing unit 208 executes processing such as processing on images input from the scanner 230, processing on images to be output to the printer 240, image rotation, image compression, resolution conversion, color space conversion, and gradation conversion.

Figure 3:
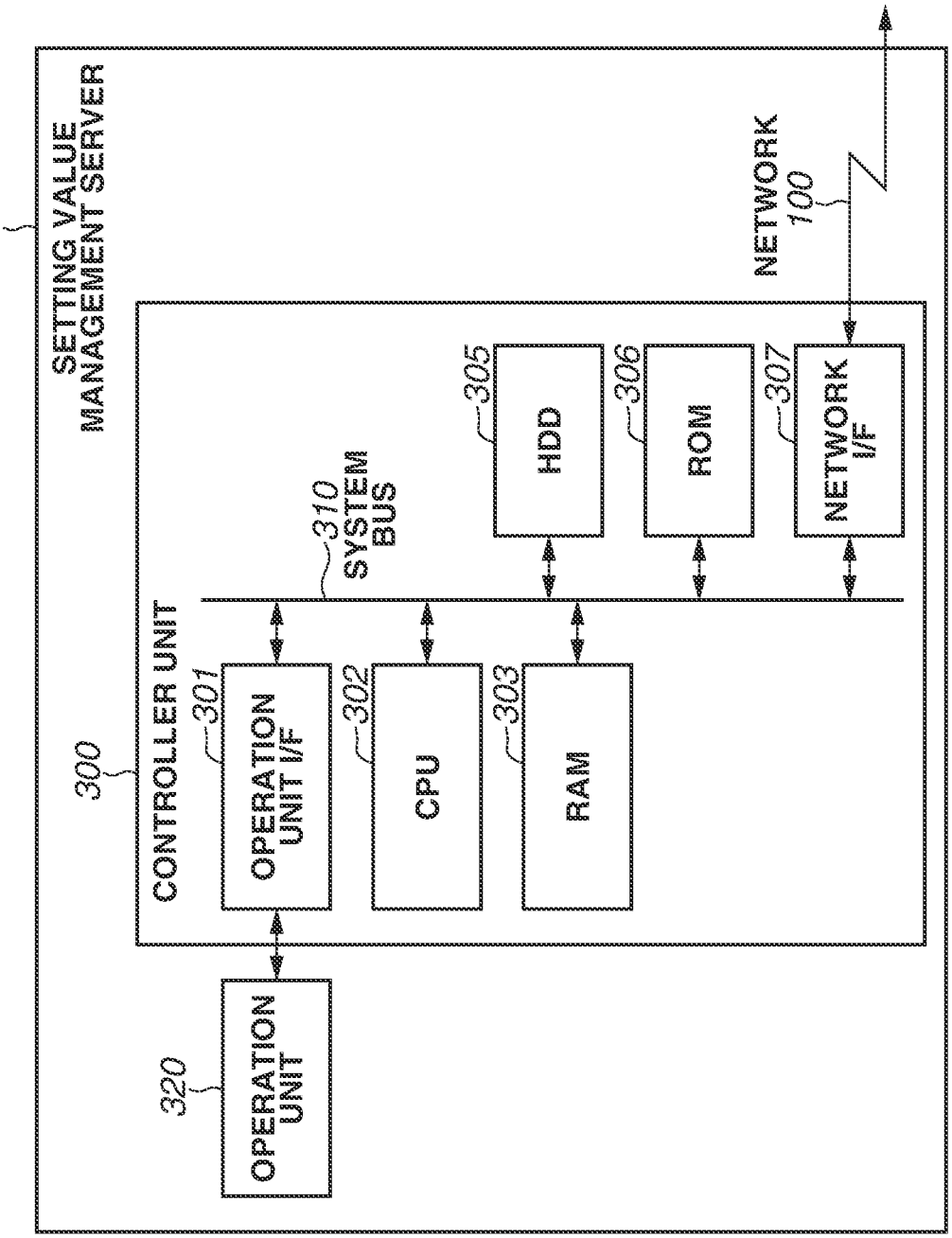
FIG. 3 illustrates an example of a hardware configuration of a setting value management server.

FIG. 3 illustrates an example of a hardware configuration of the setting value management server 120. The setting value management server 120 includes a controller unit 300 and an operation unit 320. More specifically, the controller unit 300 includes a CPU 302, and the CPU 302 activates an OS using a boot program stored in a ROM 306. The CPU 302 executes the OS an application program stored in a HDD 305 to thereby execute various types of processing. A RAM 303 is used as a work area of the CPU 302. The HDD 305 stores the application program and device setting values and user setting values of the MFP 110. The RAM 303 is an example of a cache memory of the setting value management server 120. The HDD 305 is an example of a storage device of the setting value management server 120. An operation unit I/F 301, a network I/F 307, the RAM 303, and the ROM 306 are connected to the CPU 302 via a system bus 310.

The operation unit I/F 301 is an interface between the controller unit 300 and the operation unit 320 including a mouse and a keyboard. The operation unit I/F 301 transmits, to the CPU 302, information input by the user via the operation unit 320. The network I/F 307 is a network interface that is connected to the network 100 and performs input and output of information via the network 100 with apparatuses on the network 100. The network I/F 307 is an example of a reception unit that receives requests from the MFP 110.

The function of the setting value management server 120 can be on the MFP 110 (device server). In this case, the operation unit I/F 201, the CPU 202, the RAM 203, the HDD 205, and the ROM 206 are used in place of the operation unit I/F 301, the CPU 302, the RAM 303, the HDD 305, and the ROM 306, respectively. The network I/F 207 and the operation unit 220 are used in place of the network I/F 307 and the operation unit 320, respectively.

Figure 4:
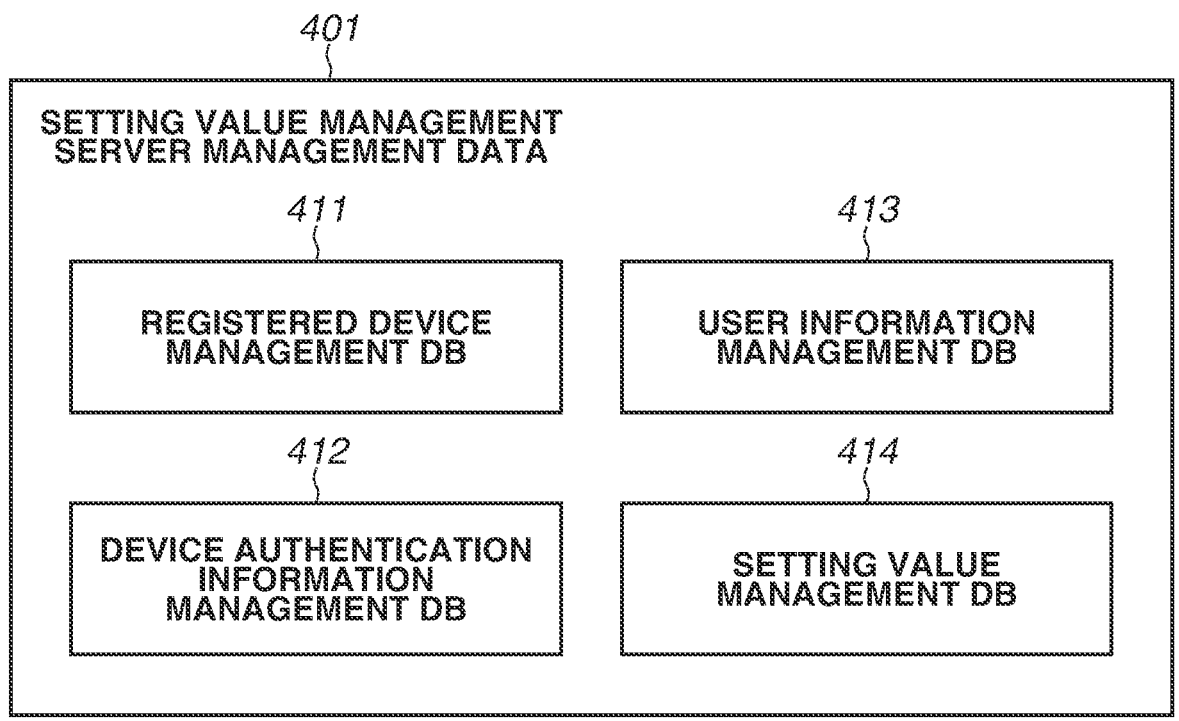
FIG. 4 illustrates an example of a data configuration managed by the setting value management server.

FIG. 4 illustrates an example of a data configuration managed by the setting value management server 120. A setting value management server management data 401 includes a registered device management database (DB) 411, a device authentication information management DB 412, a user information management DB 413, and a setting value management DB 414, and is stored in the HDD 305 of the setting value management server 120.

The registered device management DB 411 stores registration information about the MFP 110 synchronized with the setting value management server 120. The registered device management DB 411 stores a device identifier for uniquely identifying the MFP 110 and status data indicating the synchronization state of the MFP 110, as described in Table 1.

TABLE 1

| Registered Device Management DB | |
|---|---|
| Device Identifier | Status |
| device_100001 | Start |
| device_100002 | Stop |

The device authentication information management DB 412 manages authentication information about the MFP 110. The device authentication information management DB 412 stores the device identifier, an authorization token, and issue date/time information, as described in Table 2 below. The device identifier is an identifier for uniquely identifying the MFP 110. The authorization token is a token indicating that the MFP 110 is authorized to execute synchronization processing to synchronize with the setting value management server 120. The authorization token is an example of authorization data. The issue date/time is information indicating when authorization information is issued by the setting value management server 120. The authorization token is invalidated when a predetermined period elapses since the issue date/time. The timing to determine that the authorization token is invalidated is, for example, as follows.

If a synchronization request is made by the MFP 110, the setting value management server 120 compares the current date/time with the issue date/time. Then, if the predetermined period elapses, the setting value management server 120 determines that the authorization token is invalidated, and the setting value management server 120 deletes the corresponding authorization token from the device authentication information management DB 412 and requests the MFP 110 to re-register. Alternatively, the setting value management server 120 periodically compares the current date/time with the issue date/time, and if the predetermined period elapses, the setting value management server 120 determines that the authorization token is invalidated, and the setting value management server 120 deletes the corresponding authorization token from the device authentication information management DB 412.

TABLE 2

Device Authentication Information Management DB

| Device Identifier | Authorization Token | Issue Date/Time |
|---|---|---|
| device_100001 | ABCDE | 2016 Dec. 31 0:00 |
| device_100002 | FGHIJ | 2017 Jan. 1 0:00 |

The user information management DB 413 manages user information associated with the setting value for which the setting value management server 120 is synchronized with the MFP 110. The user information management DB 413 stores information, such as a user identifier (ID), for uniquely identifying the user and a user name indicating the display name of the user, as described in Table 3.

TABLE 3

User Information Management DB

| User ID | User Name |
|---|---|
| user01 | Taro |
| user02 | John |

The setting value management DB 414 stores the setting value for which the setting value management server 120 is synchronized with the MFP 110. The setting value management DB 414 stores a setting value identifier for identifying the setting value and data indicating setting value information, as described in Table 4.

TABLE 4

Setting Value Management DB

| Setting Value Identifier | Data |
|---|---|
| addressbook.fax_addressbook.1 | XXX-000-1111 |
| addressbook.fax_addressbook.2 | XXX-000-2222 |

TABLE 4-continued

Setting Value Management DB

| Setting Value Identifier | Data |
|---|---|
| custom_menu.type | COPY |
| custom_menu.settingvalue | 1A2B3C4D5E6F |
| user01.language | JP |
| user02.language | EN |
| device_100001.settings.common.sleep_time | 10 min. |
| device_100002.settings.common.sleep_time | 30 min. |

Figure 5:
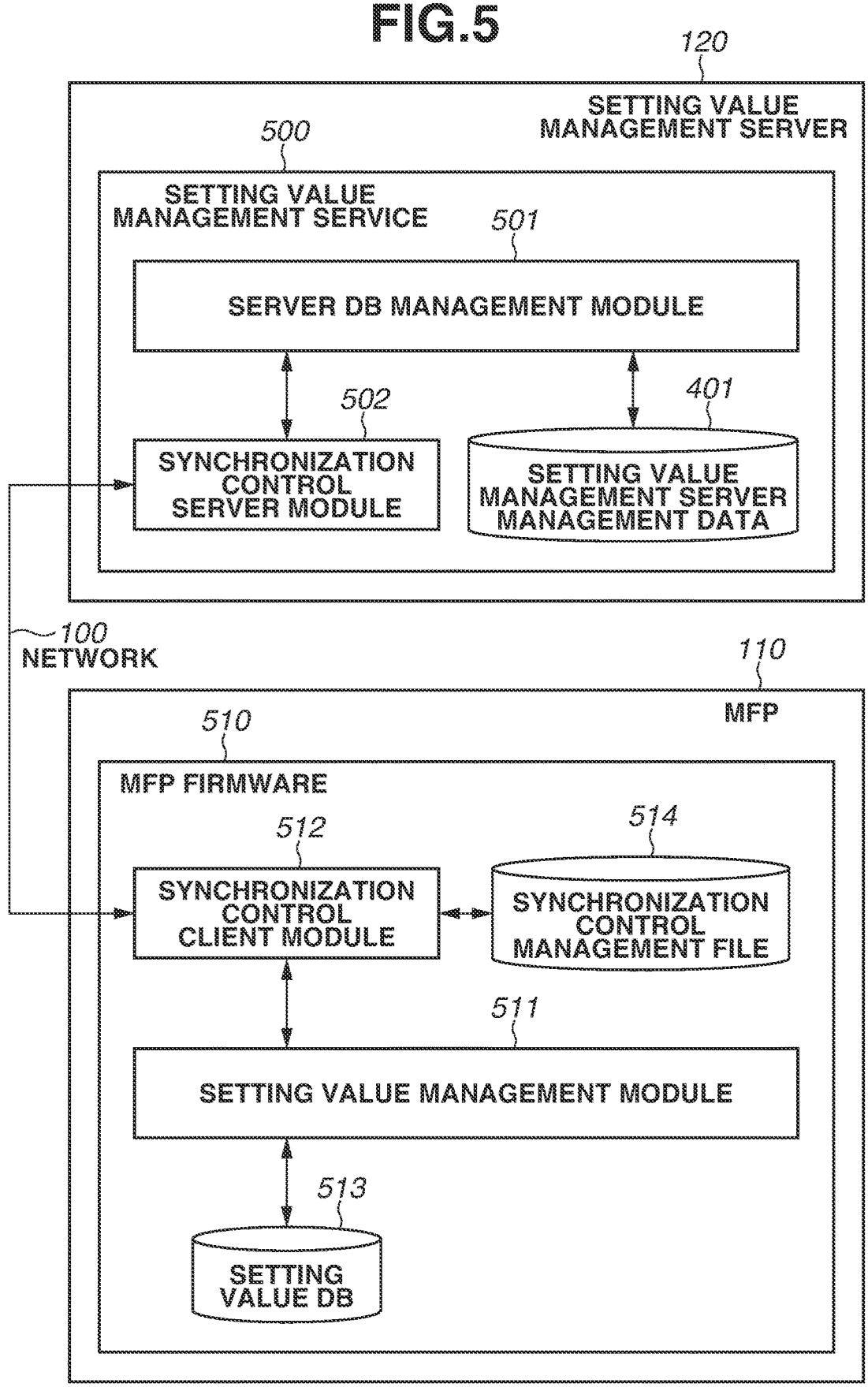
FIG. 5 illustrates an example of a software configuration of the MFP and the setting value management server.

FIG. 5 illustrates an example of a software configuration of the MFP 110 and the setting value management server 120.

The CPU 202 reads and executes a program of a MFP firmware 510 that is stored in the HDD 205 to realize functional units of the MFP 110. The CPU 302 reads and executes a program of a setting value management service 500 that is stored in the HDD 305 to realize functional units of the setting value management server 120.

The setting value management service 500 includes a server DB management module 501 configured to edit data of the setting value management server management data 401, and all data are edited via the server DB management module 501. A synchronization control server module 502 receives data acquisition requests and change requests from the MFP 110 using the network 100 and instructs the server DB management module 501 to execute reading or writing. The MFP firmware 510 includes a setting value DB 513, and reading and writing processing on the setting value DB 513 is executed via a setting value management module 511. While not illustrated in FIG. 5, every application program operating on the MFP 110 uses the setting value management module 511 to access the setting value DB 513. The setting value DB 513 is stored on the HDD 205 and includes elements such as a setting value identifier and a setting value.

A synchronization control client module 512 transmits, via the network 100, a data synchronization request to the synchronization control server module 502 of the setting value management service 500. The synchronization control client module 512 then executes an operation to retrieve a change made to the DBs of the setting value management server 120 into the MFP 110 or an operation to reflect an update to the setting value DB 513 of the MFP 110 in the DBs of the setting value management server 120. The synchronization control client module 512 writes to and reads from a synchronization control management file 514 information that is necessary for the data synchronization request. The synchronization control management file 514 is stored on the HDD 205 and stores information such as the last update time of the setting value, authentication method, authentication token, and synchronization control log.

The timing at which the synchronization control client module 512 transmits a synchronization request is a timing caused by a specific trigger or a timing of constant polling. A request of a specific trigger is used to, for example, acquire the user-specific setting value of a logged-in user when the user executes login processing from the operation unit 220. Constant polling is used to, for example, detect a change of the user-shared setting value that causes no trigger for a synchronization request, unlike the user login processing. Constant polling is used at different polling intervals for each setting value identifier of the setting value management DB 414.

The data synchronization request includes an all data acquisition request and a difference data acquisition request. The all data acquisition request is a request for all data on the setting value management service 500, whereas the difference data acquisition request is a request for only updated data from specific time. The term "difference data" refers to data that indicates a difference between setting information stored in the MFP 110 as a client and setting information stored in the setting value management server 120. In the present exemplary embodiment, the difference data is updated data that indicates contents of an update made to the setting information managed by the setting value management server 120 after the setting value management server 120 and the client synchronize the setting information once. The client notifies the setting value management server 120 of the previous synchronization time. If the setting information managed by the setting value management server 120 includes setting information updated at or after the notified time, the setting value management server 120 notifies the client of the updated setting information as difference data. The data synchronization request includes a data registration request and a data update request. The data registration request is a request for registration of new data, whereas the data update request is a request for an update of specific data. The all data acquisition request is used to acquire all the setting values of the setting value management server management data 401 in a state where the setting value management service 500 and the MFP firmware 510 have not executed data synchronization and reflect the acquired setting values in the setting value DB 513 to start synchronization. The difference data acquisition request is used to acquire only the setting value updated since the setting value management service 500 and the MFP firmware 510 have already started synchronization. The series of operations of reflecting a change of the setting value DB 513 in the setting value management server management data 401, detecting a change of the setting value management server management data 401 and reflecting the detected change in the setting value DB 513 are considered as synchronization control.

The data synchronization request contains, for example, the device identifier for uniquely identifying the MFP 110, the authorization token for confirming that the MFP 110 is authorized, and the setting value identifier for designating the setting value to be acquired, registered, or updated. The data synchronization request contains, for example, setting value data to be registered or updated and information such as the update time indicating the time at which the setting value is updated on the MFP 110.

In the above-described case of the operation form of the device server, the setting value management service 500 and the MFP firmware 510 both operate on the MFP 110.

Figure 6:
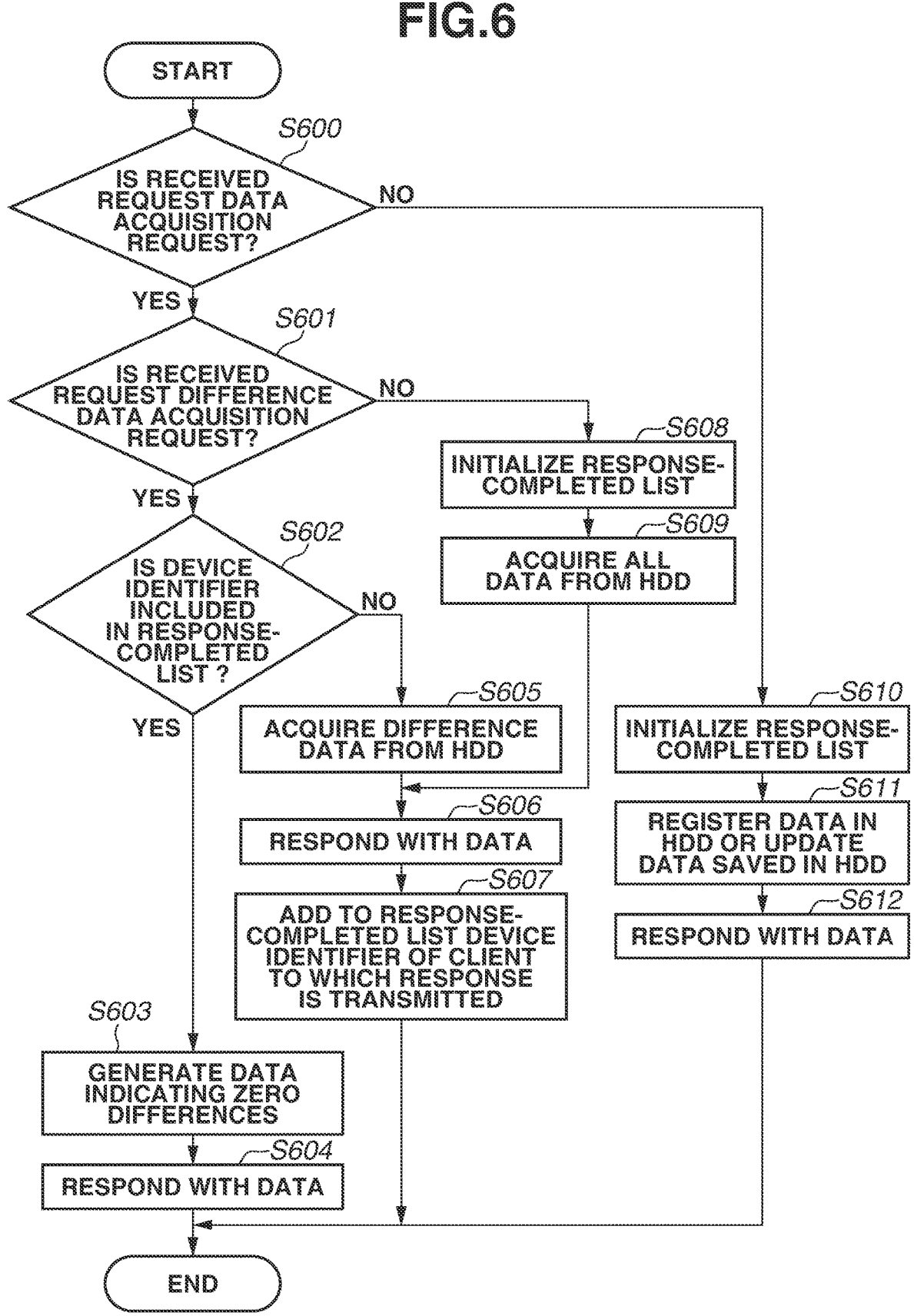
FIG. 6 is a flowchart illustrating an example of information processing which is executed by the setting value management server.

FIG. 6 is a flowchart illustrating an example of information processing that is executed if the setting value management server 120 receives a data synchronization request from the MFP 110 via the network 100. The CPU 302 of the setting value management server 120 loads a program of the setting value management service 500 stored in the HDD 305 into the RAM 303 and executes the program to realize the steps of the flowchart.

In step S600, the setting value management service 500 determines whether the received request is a data acquisition request. If the setting value management service 500 determines that the received request is a data acquisition request (YES in step S600), the processing proceeds to step S601. If the setting value management service 500 determines that the received request is not a data acquisition request (NO in step S600), the processing proceeds to step S610.

In step S601, the setting value management service 500 determines whether the received request is a difference data acquisition request. If the setting value management service 500 determines that the received request is a difference data acquisition request (YES in step S601), the processing proceeds to step S602. If the setting value management service 500 determines that the received request is not a difference data acquisition request (NO in step S601), the processing proceeds to step S608.

In step S602, the setting value management service 500 determines whether the device identifier of the MFP 110 from which the request is transmitted is included in a response-completed list illustrated in Table 5. The response-completed list is an identification information list of clients to which an updated data response has been transmitted. The response-completed list is a table as illustrated in Table 5 that stores the device identifier of the MFP 110 to which a response once returned in response to a difference data acquisition request. The response-completed list is stored in the RAM 303. If the setting value management service 500 determines that the device identifier is included in the response-completed list (YES in step S602), the processing proceeds to step S603. If the setting value management service 500 determines that the device identifier is not included in the response-completed list (NO in step S602), the processing proceeds to step S605.

TABLE 5

| Device Identifier |
| --- |
| device_100001 |
| device_100002 |

The response-completed list is an example of a list of device identifiers to which a response has been transmitted. The device identifier is an example of identification information for identifying a client apparatus.

In step S603, the setting value management service 500 generates empty response data indicating zero differences, and the processing proceeds to step S604.

In step S604, the setting value management service 500 responds to the MFP 110 with the response data generated in step S603, and the process illustrated in the flowchart in FIG. 6 ends. In this process, the server DB management module 501 does not access the setting value management server management data 401, so no access to the HDD 305 occurs.

In step S605, the setting value management service 500 acquires difference data from the setting value DB 513 stored in the HDD 305, and the processing proceeds to step S606.

In step S606, the setting value management service 500 responds to the MFP 110 with the difference data acquired in step S605, and the processing proceeds to step S607.

In step S607, the setting value management service 500 adds to the response-completed list the device identifier of the MFP 110 to which the setting value management service 500 responds, and the process illustrated in the flowchart in FIG. 6 ends.

In step S608, the setting value management service 500 deletes all the device identifiers from the response-completed list to initialize the response-completed list, and the processing proceeds to step S609.

In step S609, the setting value management service 500 acquires all data corresponding to the setting value identifier designated by the MFP 110 from the setting value management DB 414 of the setting value management server management data 401 via the server DB management module 501. Then, the processing proceeds to step S606.

In step S610, the setting value management service 500 deletes all the device identifiers from the response-completed list to initialize the response-completed list, and the processing proceeds to step S611.

In step S611, in the case of the data registration request, the setting value management service 500 registers in the setting value management DB 414 the setting value identifier designated by the MFP 110 and the designated value. In the case of the data update request, the setting value management service 500 updates the data that corresponds to the setting value identifier designated by the MFP 110 and is stored in the setting value management DB 414 with the value designated by the MFP 110. Then, the processing proceeds to step S612.

In step S612, the setting value management service 500 returns to the MFP 110 the result of the registration processing or updating processing executed in step S611, and the process illustrated in the flowchart in FIG. 6 ends.

According to the first exemplary embodiment, if there is no difference data for a difference data acquisition request that is constantly made, a response can be made without access to the HDD 305. In this way, access to the HDD 305 is reduced because constant access to the HDD 305 is not needed in the case in which no change is made to the setting value management server management data 401.

A second exemplary embodiment will be described below. In the second exemplary embodiment, a case in which authentication information needs to be verified when the setting value management server 120 receives a synchronization request from the MFP 110 will be described.

If verification of authentication information is needed upon receipt of the request from the MFP 110 by the setting value management server 120, the setting value management server 120 accesses the device authentication information management DB 412, so access to the HDD 305 occurs.

In the second exemplary embodiment, the information of the device authentication information management DB 412 is stored in a device authentication information list as illustrated in Table 6 in the RAM 303 to reduce access to the HDD 305. The device authentication information list in Table 6 is a table that holds the same device identifiers and same authorization tokens as the information stored in the device authentication information management DB 412. The device authentication information list is stored in the RAM 303.

TABLE 6

| Device Authentication Information List | |
|---|---|
| Device Identifier | Authorization Token |
| device_100001 | ABCDE |
| device_100002 | FGHIJ |

Figure 7:
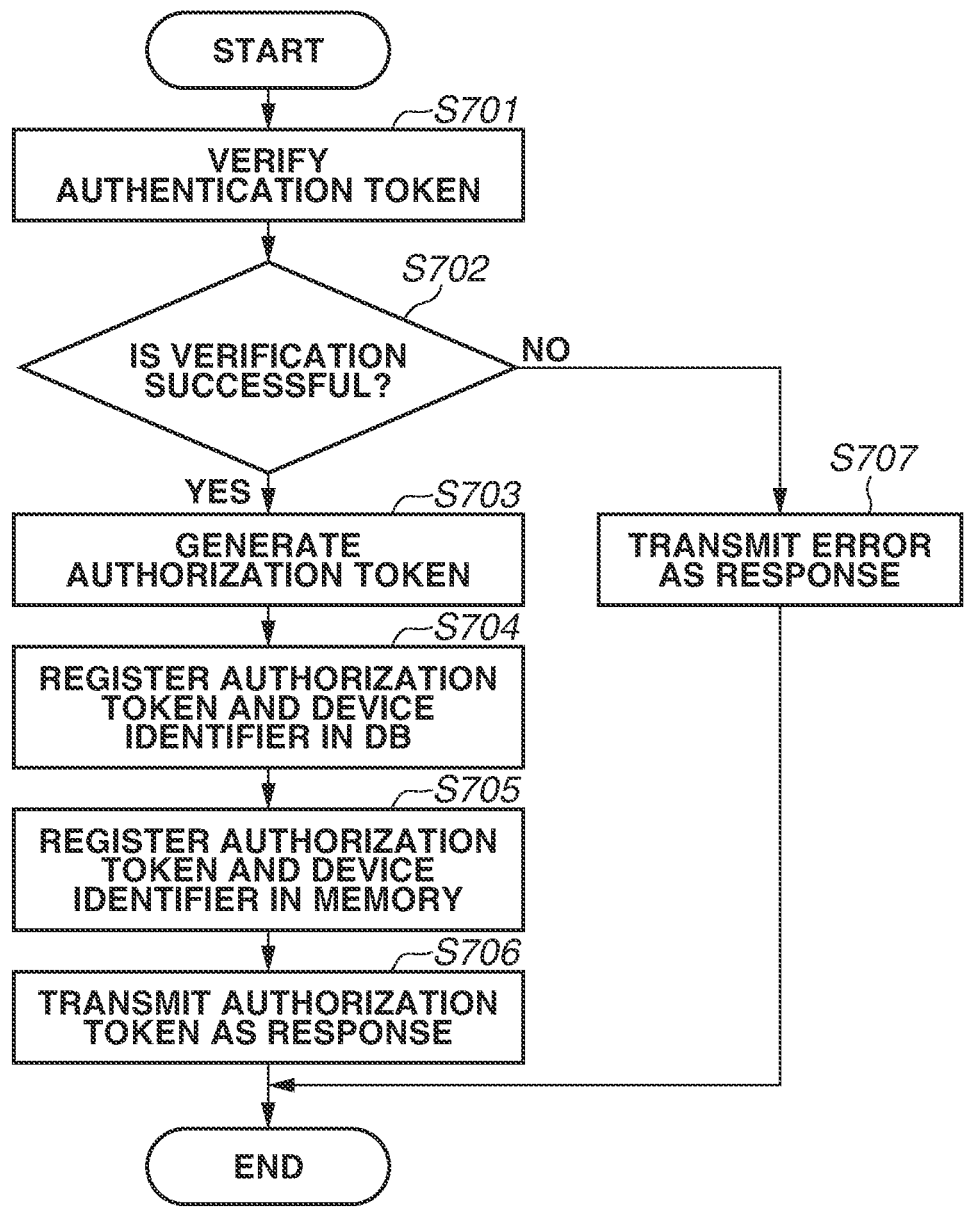
FIG. 7 is a flowchart illustrating an example of information processing which is executed by the setting value management server.

FIG. 7 is a flowchart illustrating an example of information processing that is executed if the setting value management server 120 receives a device identifier registration request from the MFP 110 via the network 100. The CPU 302 of the setting value management server 120 loads the program of the setting value management service 500 stored in the HDD 305 into the RAM 303 and executes the program to realize the steps of the flowchart.

In step S701, the setting value management service 500 verifies an authentication token included in the device identifier registration request transmitted from the MFP 110, and the processing proceeds to step S702. The authentication token is, for example, a token indicating that the MFP 110 is authenticated by a specific authentication server using device manager information. The setting value management service 500 transmits the authentication token to the specific authentication server to verify the validity.

In step S702, the setting value management service 500 determines whether the verification is successful based on the result of verification in step S701. If the setting value management service 500 determines that the verification is successful (YES in step S702), the processing proceeds to step S703. If the setting value management service 500 determines that the verification is unsuccessful (NO in step S702), the processing proceeds to step S707.

In step S703, the setting value management service 500 generates an authorization token for use in authentication in subsequent communications, and the processing proceeds to step S704. The authorization token is set to a value by which each MFP 110 performing communication is uniquely distinguished.

In step S704, the setting value management service 500 registers in the device authentication information management DB 412 the authorization token and the device identifier together with information such as the issue date/time of the token, and the processing proceeds to step S705.

In step S705, the setting value management service 500 stores the authorization token and the device identifier in the device authentication information list stored in the RAM 303, and the processing proceeds to step S706. The device authentication information list is an example of the authentication list.

In step S706, the setting value management service 500 transmits to the MFP 110 the authorization token generated in step S703 as a response, and the process illustrated in the flowchart in FIG. 7 ends.

In step S707, the setting value management service 500 transmits an error as a response to the MFP 110, and the process illustrated in the flowchart in FIG. 7 ends.

Figure 8B:
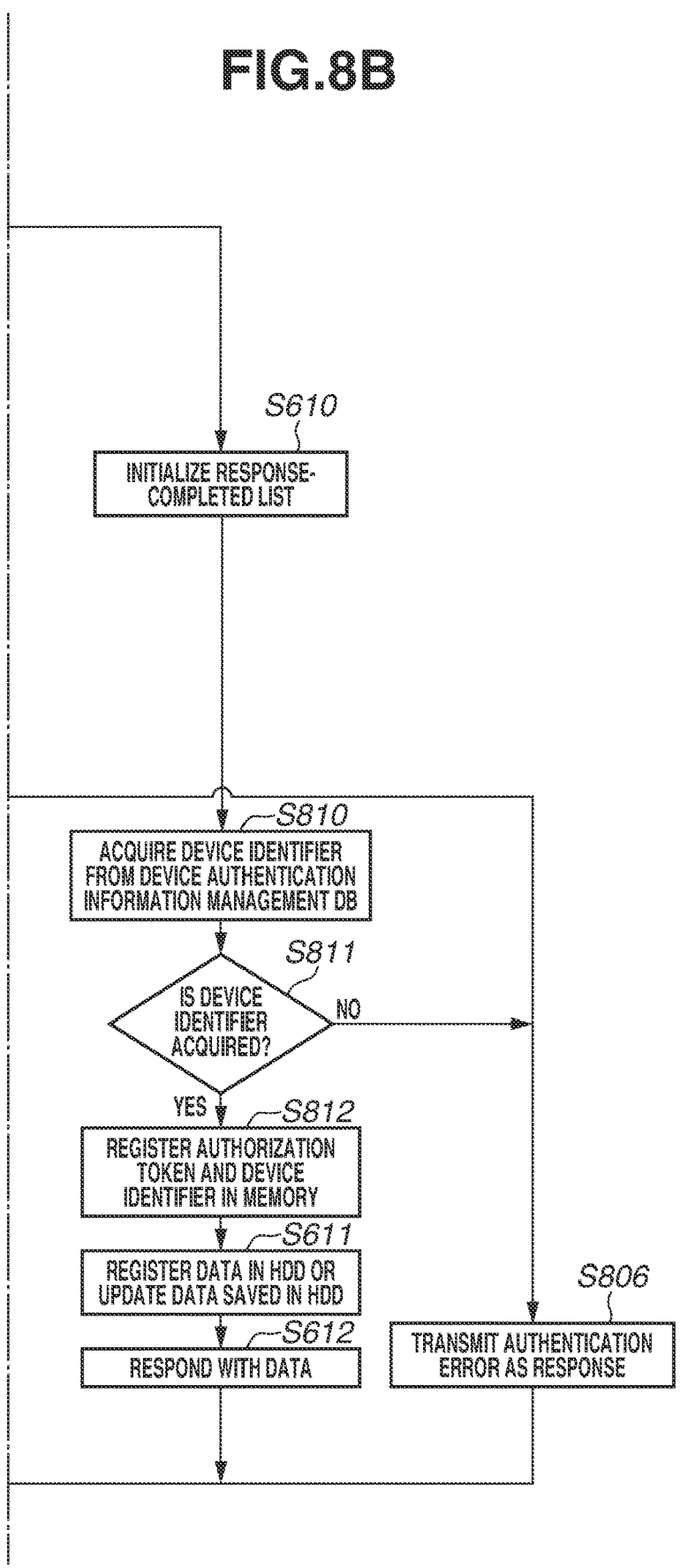

FIGS. 8A and 8B, collectively FIG. 8, is a flowchart illustrating an example of information processing that is executed if the setting value management server 120 receives a data synchronization request from the MFP 110 via the network 100, similar to that illustrated in FIG. 6 according to the first exemplary embodiment. Only a different part of the process from that in FIG. 6 will be described below. The CPU 302 of the setting value management server 120 loads a program of the setting value management service 500 stored in the HDD 305 into the RAM 303 and executes the program to realize the steps of the flowchart.

In step S801, the setting value management service 500 determines whether the authorization token transmitted from the MFP 110 is included in the device authentication information list. If the setting value management service 500 determines that the authorization token transmitted from the MFP 110 is included in the device authentication information list (YES in step S801), the processing proceeds to step S802. If the setting value management service 500 determines that the authorization token transmitted from the MFP 110 is not included in the device authentication information list (NO in step S801), the processing proceeds to step S803.

In step S802, the setting value management service 500 acquires a device identifier corresponding to the authorization token from the device authentication information, and the processing proceeds to step S602.

In step S803, the setting value management service 500 acquires a device identifier corresponding to the authorization token from the device authentication information management DB 412.

In step S804, the setting value management service 500 determines whether the device identifier corresponding to the authorization token is acquired. If the setting value management service 500 determines that the device identifier corresponding to the authorization token is acquired (YES in step S804), the processing proceeds to step S805. If the setting value management service 500 determines that the device identifier corresponding to the authorization token is not acquired (NO in step S804), the processing proceeds to step S806.

In step S805, the setting value management service 500 stores the authorization token and the device identifier in the device authentication information list stored in the RAM 303.

In step S806, the setting value management service 500 returns a response indicating an authentication error to the MFP 110, and the process illustrated in the flowchart in FIG. 8 ends.

In step S807, the setting value management service 500 acquires the device identifier corresponding to the authorization token from the device authentication information management DB 412, and the processing proceeds to step S808.

In step S808, the setting value management service 500 determines whether the device identifier corresponding to the authorization token is acquired. If the setting value management service 500 determines that the device identifier corresponding to the authorization token is acquired (YES in step S808), the processing proceeds to step S809. If the setting value management service 500 determines that the device identifier corresponding to the authorization token is not acquired (NO in step S808), the processing proceeds to step S806.

In step S809, the setting value management service 500 stores the authorization token and the device identifier in the device authentication information list stored in the RAM 303, and the processing proceeds to step S609.

In step S810, the setting value management service 500 acquires from the device authentication information management DB 412 the device identifier corresponding to the authorization token, and the processing proceeds to step S811.

In step S811, the setting value management service 500 determines whether the device identifier corresponding to the authorization token is acquired. If the setting value management service 500 determines that the device identifier corresponding to the authorization token is acquired (YES in step S811), the processing proceeds to step S812. If the setting value management service 500 determines that the device identifier corresponding to the authorization token is not acquired (NO in step S811), the processing proceeds to step S806.

In step S812, the setting value management service 500 stores the authorization token and the device identifier in the device authentication information list stored in the RAM 303, and the processing proceeds to step S610.

In the flowchart, authorization token verification processing (steps S801 to S811) is executed after the request type sorting (steps S600 and S601). Alternatively, the setting value management service 500 can execute the request type sorting after the authorization token verification processing.

Examples of the timing at which the setting value management service 500 initializes the device authentication information list include the timing at which the setting value management server 120 initializes the response-completed list (steps S608 and S609), the timing at which the authorization token is registered (step S704), and the timing at which the response with the authentication error is transmitted to the MFP 110 (step S806). The device authentication information list is initialized by deleting all the device identifiers and the authorization tokens.

According to the second exemplary embodiment, even when the verification of authentication information needs to be executed for each difference data acquisition request that is constantly made, constant access to the HDD 305 is unnecessary if no change is made to the setting value management server management data 401. Thus, access to the HDD 305 is reduced.

A third exemplary embodiment will be described below. In the third exemplary embodiment, a process that is executed in a case in which a difference data acquisition request is made for each type of data to be synchronized from the MFP 110 will be described.

Figure 9:
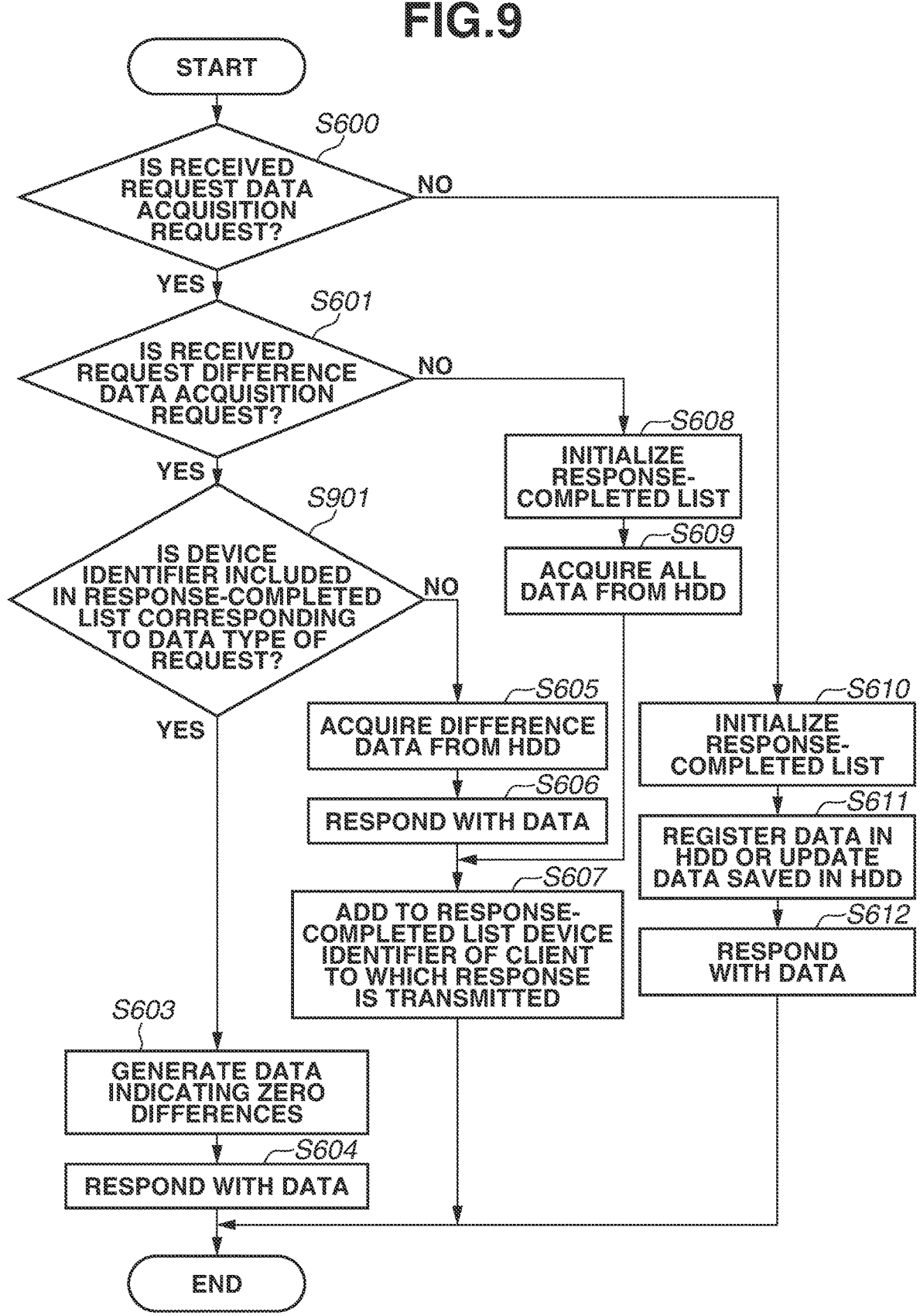
FIG. 9 is a flowchart illustrating an example of information processing which is executed by the setting value management server.

FIG. 9 is a flowchart illustrating an example of information processing that is executed by the setting value management service 500 if the setting value management server 120 receives a data synchronization request from the MFP 110 via the network 100, as in FIG. 6 according to the first exemplary embodiment. Only a different part of the process from that in FIG. 6 will be described below. The CPU 302 of the setting value management server 120 loads a program of the setting value management service 500 stored in the HDD 305 into the RAM 303 and executes the program to realize the steps of the flowchart.

In step S901, the setting value management service 500 determines whether a combination of a synchronization application programming interface (API) identifier and a device identifier designated by the MFP 110 is included in the response-completed list as illustrated in Table 7. The response-completed list of Table 7 below is stored in the RAM 203 and stored for each synchronization API identifier the device identifier of the MFP 110 to which a response has been transmitted. The synchronization API identifier indicates the type of the setting value identifier of the setting value management DB 414. The setting value management service 500 determines whether the identifier is the corresponding identifier based on whether the synchronization API identifier is included in the setting value identifier. For example, the setting value identifier "addressbook.fax_addressbook.1" in Table 4 includes the synchronization API identifier "addressbook" in Table 7. Therefore, "addressbook.fax_addressbook.1" is the setting value of the type of the synchronization API "addressbook".

If the setting value management service 500 determines that the combination is included (YES in step S901), the processing proceeds to step S603. If the setting value management service 500 determines that the combination is not included (NO in step S901), the processing proceeds to step S605.

TABLE 7

Response-completed list

| Synchronization API Identifier | addressbook | custom_menu |
|---|---|---|
| Device Identifier | device_100001 device_100002 | device_100001 |

TABLE 8

Response-Completed List

| Synchronization API Identifier/ User Identifier | addressbook | custom_ menu | user01 | user02 | ... |
|---|---|---|---|---|---|
| Device Identifier | device_ 100001 device_ 100002 | device_ 100001 | device_ 100002 | device_ 100001 | |

According to the third exemplary embodiment, even if a difference data acquisition request is made for each type of data to be synchronized from the MFP 110, whether a response has been transmitted is managed for each difference data type. Thus, a response can be returned to the MFP 110 to which a response has been transmitted without access to the HDD 305.

A fourth exemplary embodiment will be described below. In the fourth exemplary embodiment, a method of reducing access to the HDD 305 not only with respect to the constant data synchronization requests, but also with respect to a difference data acquisition request caused by a specific trigger, such as user login, will be described below.

Figure 10:
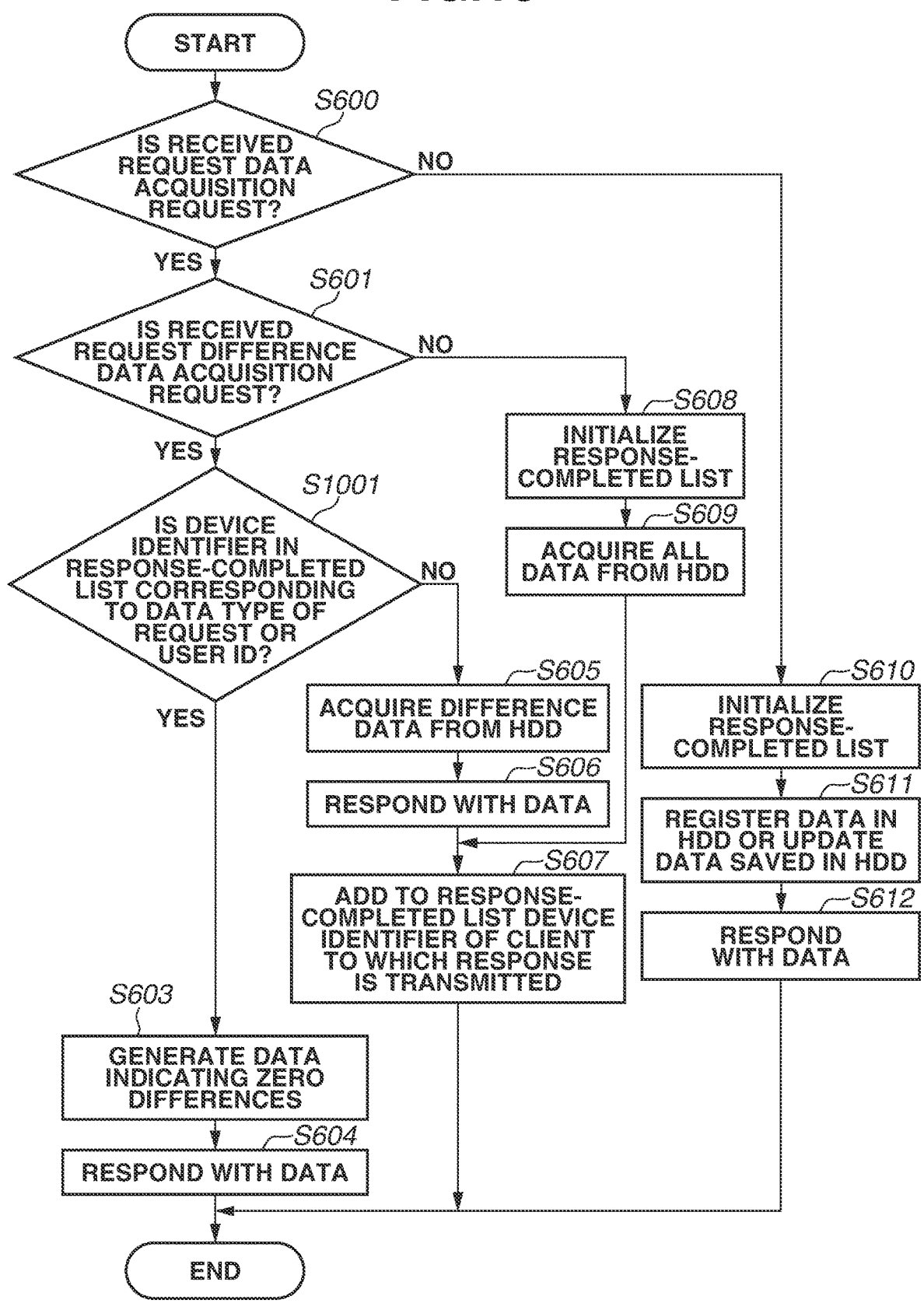
FIG. 10 is a flowchart illustrating an example of information processing which is executed by the setting value management server.

FIG. 10 is a flowchart illustrating an example of information processing that is executed if the setting value management server 120 receives a data synchronization request from the MFP 110 via the network 100, as in FIG. 6 according to the first exemplary embodiment. Only a different part of the process from that in FIG. 6 will be described below. The CPU 302 of the setting value management server 120 loads a program of the setting value management service 500 stored in the HDD 305 into the RAM 303 and executes the program to realize the steps of the flowchart.

In step S1001, the setting value management service 500 determines whether a combination of the synchronization API identifier and the device identifier or a combination of the user identifier and the device identifier that is designated by the MFP 110 is included in the response-completed list as illustrated in Table 8 below. The response-completed list of Table 8 is stored in the RAM 203 and stored for each synchronization API identifier/user identifier the device identifier of the MFP 110 to which a response has been transmitted. The synchronization API identifier indicates the type of the setting value identifier of the setting value management DB 414. The setting value management service 500 determines whether the identifier is the corresponding identifier based on whether the synchronization API identifier or the user identifier is included in the setting value identifier. For example, the setting value identifier "user01.language" in Table 4 includes the user identifier "user01" in Table 8, so "user01.language" is the setting value of the type of the user identifier "user01".

If the setting value management service 500 determines that the combination is included (YES in step S1001), the processing proceeds to step S603. If the setting value management service 500 determines that the combination is not included (NO in step S1001), the processing proceeds to step S605.

According to the fourth exemplary embodiment, the response-completed list is stored for each user, so even in the case of the difference data acquisition request caused by a specific trigger, such as user login, access to the HDD 305 is unnecessary if no change is made to the setting value management server management data 401. Thus, access to the HDD 305 is reduced.

A fifth exemplary embodiment will be described below. In the fifth exemplary embodiment, a method of reducing access to the HDD 205 in the MFP 110 operating as a client will be described.

Figure 11:
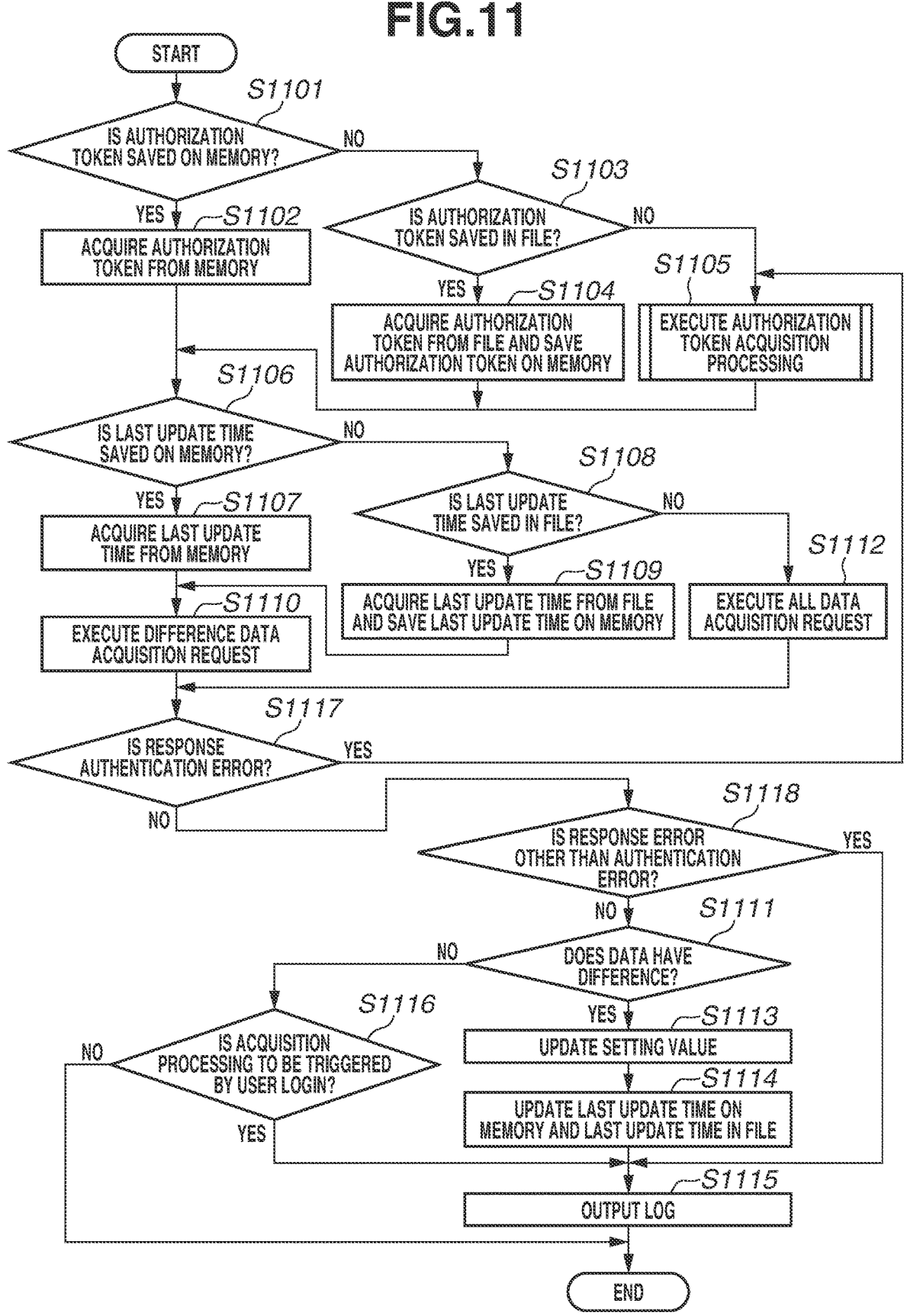
FIG. 11 is a flowchart illustrating an example of information processing which is executed by the MFP.

FIG. 11 is a flowchart illustrating an example of information processing by which the MFP 110 transmits a data acquisition request to the setting value management server 120. The CPU 202 of the MFP 110 loads the MFP firmware 510 stored in the HDD 205 into the RAM 203 and executes the MFP firmware 510 to realize the steps of the flowchart.

In step S1101, the MFP firmware 510 determines whether the authorization token is stored in the RAM 203. If the MFP firmware 510 determines that the authorization token is stored in the RAM 203 (YES in step S1101), the processing proceeds to step S1102. If the MFP firmware 510 determines that the authorization token is not stored in the RAM 203 (NO in step S1101), the processing proceeds to step S1103.

In step S1102, the MFP firmware 510 acquires the authorization token from the RAM 203, and the processing proceeds to step S1106.

In step S1103, the MFP firmware 510 determines whether the authorization token is stored in the synchronization control management file 514. If the MFP firmware 510 determines that the authorization token is stored in the synchronization control management file 514 (YES in step S1103), the processing proceeds to step S1104. If the MFP firmware 510 determines that the authorization token is not stored in the synchronization control management file 514 (NO in step S1103), the processing proceeds to step S1105.

In step S1104, the MFP firmware 510 acquires the authorization token from the synchronization control management file 514 and stores the acquired value in the RAM 203, and the processing proceeds to step S1106.

In step S1105, the MFP firmware 510 executes authorization token acquisition processing, and the processing proceeds to step S1106. Details of the authorization token acquisition processing will be described below with reference to FIG. 12.

In step S1106, the MFP firmware 510 determines whether the last update time is stored on the RAM 203. If the MFP firmware 510 determines that the last update time is stored in the RAM 203 (YES in step S1106), the processing proceeds to step S1107. If the MFP firmware 510 determines that the last update time is not stored in the RAM 203 (NO in step S1106), the processing proceeds to step S1108. As used herein, the term "last update time" refers to the time at which the setting value for which the acquisition processing is to be executed is updated in the setting value DB 513, and the last update time is used in making a difference data acquisition request at or after the time.

In step S1107, the MFP firmware 510 acquires the last update time from the RAM 203, and the processing proceeds to step S1110.

In step S1108, the MFP firmware 510 determines whether the last update time is stored in the synchronization control management file 514. If the MFP firmware 510 determines that the last update time is stored in the synchronization control management file 514 (YES in step S1108), the processing proceeds to step S1109. If the MFP firmware 510 determines that the last update time is not stored in the synchronization control management file 514 (NO in step S1108), the processing proceeds to step S1112.

In step S1109, the MFP firmware 510 acquires the last update time from the synchronization control management file 514 and thereafter stores the acquired value in the RAM 203, and the processing proceeds to step S1110.

In step S1110, the MFP firmware 510 transmits a difference data acquisition request to the setting value management server 120 via the network 100. At this time, the MFP firmware 510 designates the last update time acquired in step S1007 or S1109 and requests for a difference between the setting value stored in the setting value DB 513 and the setting value stored in the setting value management server management data 401. The MFP firmware 510 transmits a difference data acquisition request to the setting value management server 120 using the authorization token acquired in step S1102, S1104, or S1105. Thereafter, the MFP firmware 510 receives a response from the setting value management server 120, and the processing proceeds to step S1117.

In step S1117, the MFP firmware 510 determines whether the response transmitted from the setting value management server 120 in step S1110 is an authentication error. If the MFP firmware 510 determines that the response is not an authentication error (NO in step S1117), the processing proceeds to step S1118. The case in which the response is an authentication error is a case in which the authorization token is invalidated after a predetermined time elapses, etc. Thus, if the MFP firmware 510 determines that the response is an authentication error (YES in step S1117), an authorization token is issued again, and the processing proceeds to step S1105 to transmit the same request to the setting value management server 120.

In step S1118, the MFP firmware 510 determines whether the response transmitted from the setting value management server 120 in step S1110 is an error other than the authentication error. If the MFP firmware 510 determines that the response transmitted from the setting value management server 120 in step S1110 is an error other than the authentication error (YES in step S1118), the processing proceeds to step S1115. If the MFP firmware 510 determines that the response transmitted from the setting value management server 120 in step S1110 is not an error other than the authentication error (NO in step S1118), the processing proceeds to step S1111.

In step S1111, the MFP firmware 510 determines whether the data transmitted as a response from the setting value management server 120 in step S1110 has a difference. If the MFP firmware 510 determines that the data has a difference (YES in step S1111), the processing proceeds to step S1113. If the MFP firmware 510 determines that the data has no difference (NO in step S1111), the processing proceeds to step S1116.

In step S1112, since there is no last update time, the MFP firmware 510 transmits an all data acquisition request to the setting value management server 120 via the network 100 to acquire all the data of the setting value management server 120. Thereafter, the MFP firmware 510 receives a response from the setting value management server 120, and the processing proceeds to step S1117.

In step S1113, the MFP firmware 510 updates the setting value of the setting value DB 513 via the setting value management module 511, and the processing proceeds to step S1114.

In step S1114, the MFP firmware 510 updates the last update time on the RAM 203 and the last update time in the synchronization control management file 514, and the processing proceeds to step S1115.

In step S1115, the MFP firmware 510 outputs an execution result of the flowchart as a log. The contents of the log to be output as a setting log are, for example, the Internet Protocol (IP) address of the server to which the data acquisition request is transmitted in step S1110 or S1112 and the contents of the response from the setting value management server 120.

In step S1116, the MFP firmware 510 determines whether the acquisition processing is to be triggered by user login. If the MFP firmware 510 determines that the acquisition processing is to be triggered by user login (YES in step S1116), the processing proceeds to step S1115. If the MFP firmware 510 determines that the acquisition processing is not to be triggered by user login (NO in step S1116), the process illustrated in the flowchart in FIG. 11 ends.

Figure 12:
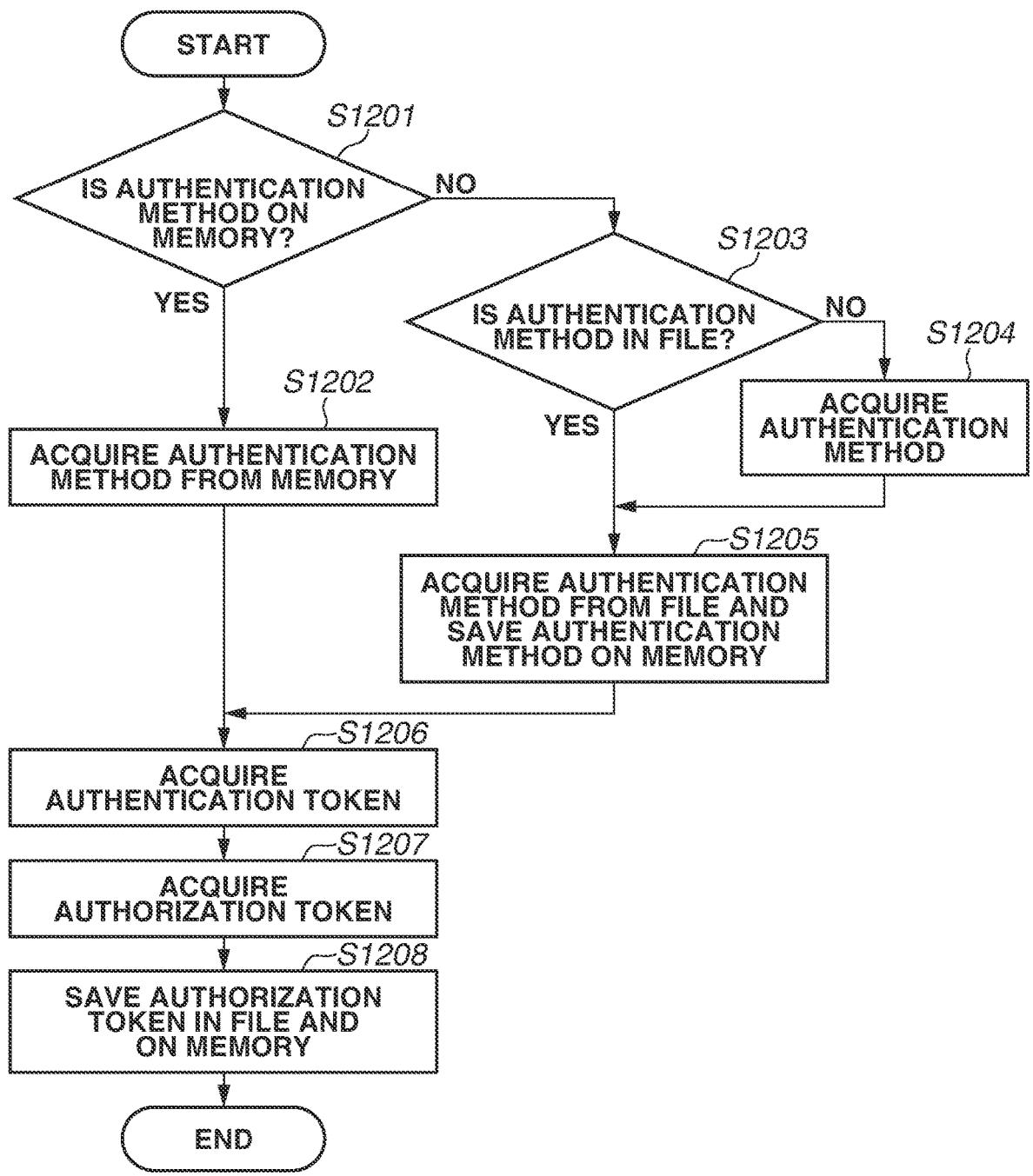
FIG. 12 is a flowchart illustrating an example of information processing which is executed by the MFP.

FIG. 12 is a flowchart illustrating an example of information processing by which the MFP 110 acquires the authorization token, illustrating details of the processing executed in step S1105. The CPU 202 of the MFP 110 loads the MFP firmware 510 stored in the HDD 205 and executes the MFP firmware 510 to realize the steps of the flowchart.

In step S1201, the MFP firmware 510 determines whether an authentication method exits on the RAM 203. If the MFP firmware 510 determines that an authentication method exits on the RAM 203 (YES in step S1201), the processing proceeds to step S1202. If the MFP firmware 510 determines that an authentication method does not exist in the RAM 203 (NO in step S1201), the processing proceeds to step S1203.

In step S1202, the MFP firmware 510 acquires the authentication method from the RAM 203, and the processing proceeds to step S1206.

In step S1203, the MFP firmware 510 determines whether the authentication method is stored in the synchronization control management file 514. If the MFP firmware 510 determines that the authentication method is stored in the synchronization control management file 514 (YES in step S1203), the processing proceeds to step S1205. If the MFP firmware 510 determines that the authentication method is not stored in the synchronization control management file 514 (NO in step S1203), the processing proceeds to step S1204.

In step S1204, the MFP firmware 510 acquires the authentication method and stores the acquired authentication method in the synchronization control management file 514, and the processing proceeds to step S1205. For example, the MFP firmware 510 acquires the authentication method, using a method of acquiring a predetermined authentication method from the file stored on the HDD 205 or using a method in which an acquisition request is transmitted from the setting value management server 120 via the network 100 to acquire the authentication method.

In step S1205, the MFP firmware 510 acquires the authentication method from the synchronization control management file 514 and stores the acquired authentication method in the RAM 203, and the processing proceeds to step S1206.

In step S1206, the MFP firmware 510 executes processing for acquiring the authentication token, and the processing proceeds to step S1207. For example, the MFP firmware 510 acquires the authentication token from a specific authentication server using device manager information of the MFP 110.

In step S1207, the MFP firmware 510 acquires, using the authentication token acquired in step S1206, the authorization token for use in communication with the setting value management server 120, and the processing proceeds to step S1208. The authorization token is issued from the setting value management server 120 if, for example, the MFP firmware 510 transmits the device identifier of the MFP 110 and the authentication token to the setting value management server 120. The processing proceeds to step S1208.

In step S1208, the MFP firmware 510 stores the authorization token acquired in step S1207 in the synchronization control management file 514 and the RAM 203, and the process illustrated in the flowchart in FIG. 12 ends.

In the fifth exemplary embodiment, information for use in execution of a request that is constantly transmitted from the MFP 110 operating as a client is read from the synchronization control management file 514 and stored in the RAM 203. Then, the MFP 110 does not output the log to the synchronization control management file 514 in a steady state in which there is no difference after the execution, and the MFP 110 outputs to the synchronization control management file 514 only the log of the time of user login. Thus, according to the fifth exemplary embodiment, control to minimize access to the setting value DB 513 and the synchronization control management file 514 stored on the HDD 205 can be executed, so access to the HDD 205 is reduced.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various examples of exemplary embodiments are described in detail above, these specific exemplary embodiments are not seen to be limiting.

For example, the above-described exemplary embodiments can be implemented in any combination.

While an HDD is described as an example of the storage device in the above-described exemplary embodiments, the storage device is not limited to the HDD, and storage devices with a failure incidence that can increase as reading and writing are repeated, such as a solid state disk (SSD), are applicable.

A single CPU executes processing based on the program stored in the ROM or the HDD in the MFP 110 and the setting value management server 120 described above. Alternatively, a plurality of CPUs (or processors) can cause a plurality of RAMS and HDDs to cooperate to execute processing based on the program in the MFP 110 and the setting value management server 120. The software configurations of the MFP 110 and the setting value management server 120 can partially or entirely be realized by hardware and implemented in the MFP 110 and the setting value management server 120.

According to each process of the above-described exemplary embodiment, access to a storage device is reduced from a timing before the failure incidence of the storage device increases.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-041866, filed Mar. 6, 2017, which is hereby incorporated by reference herein in its entirety.

What is claimed is:

1. A server apparatus comprising:
a memory device that stores a set of instructions; and
at least one processor that executes the set of instructions to:
acquire a request for updating setting information;
update, based on the request, the setting information stored in a nonvolatile storage device of the server apparatus;
delete identification information for identifying a client apparatus from an identification information list in a case where the setting information stored in the non-volatile storage device of the server apparatus is updated;
receive, from a client apparatus, an updated data acquisition request for acquisition of the updated data on the setting information about the client apparatus that is stored in the non-volatile storage device of the server apparatus;
determine whether or not identification information for identifying the client apparatus that transmitted the updated data acquisition request is included in the identification information list;
transmit, to the client apparatus, a first response indicating that the updated data does not exist without accessing the non-volatile storage device in a case where it is determined that the identification information for identifying the client apparatus that transmitted the updated data acquisition request is included in the identification information list;
transmit, to the client apparatus, a second response including updated data obtained by accessing the non-volatile storage device in a case where it is determined that the identification information for identifying the client apparatus that transmitted the updated data acquisition request is not included in the identification information list; and add the identification information for identifying the client apparatus that transmitted the updated data acquisition request for the updated data stored in the non-volatile storage device of the server apparatus to the identification information list in a case where the second response is transmitted.

2. The server apparatus according to claim 1, wherein the determination of whether the identification information for identifying the client apparatus that transmitted the updated data acquisition request is included in the identification information list is made further based on a data type designated by the client apparatus.

3. The server apparatus according to claim 1, wherein the determination of whether the identification information for identifying the client apparatus that transmitted the updated data acquisition request is included in the identification information list is made further based on a user designated by the client apparatus.

4. The server apparatus according to claim 1, wherein the non-volatile storage device is a hard disk drive (HDD).

5. The server apparatus according to claim 1, wherein the server apparatus is an image forming apparatus.

6. An information processing method executed by a server apparatus, the information processing method comprising:

acquiring a request for updating setting information;

updating, based on the request, the setting information stored in a nonvolatile storage device of the server apparatus;

deleting identification information for identifying a client apparatus from an identification information list in a case where the setting information stored in the non-volatile storage device of the server apparatus is updated;

receiving, from a client apparatus, an updated data acquisition request for acquisition of the updated data on the setting information about the client apparatus that is stored in the non-volatile storage device of the server apparatus;

determining whether or not identification information for identifying the client apparatus that transmitted the updated data acquisition request is included in the identification information list;

transmitting, to the client apparatus, a first response indicating that the updated data does not exist without accessing the non-volatile storage device in a case where it is determined that the identification information for identifying the client apparatus that transmitted the updated data acquisition request is included in the identification information list;

transmitting, to the client apparatus, a second response including updated data obtained by accessing the non-volatile storage device in a case where it is determined that the identification information for identifying the client apparatus that transmitted the updated data acquisition request is not included in the identification information list; and adding the identification information for identifying the client apparatus that transmitted the updated data acquisition request for the updated data stored in the non-volatile storage device of the server apparatus to the identification information list in a case where the second response is transmitted.

7. The information processing method according to claim 6, wherein the determination of whether the identification information for identifying the client apparatus that transmitted the updated data acquisition request is included in the identification information list is made further based on a data type designated by the client apparatus.

8. The information processing method according to claim 6, wherein the determination of whether the identification information for identifying the client apparatus that transmitted the updated data acquisition request is included in the identification information list is made further based on a user designated by the client apparatus.

9. The information processing method according to claim 6, wherein the non-volatile storage device is a hard disk drive (HDD).

10. The information processing method according to claim 6, wherein the server apparatus is an image forming apparatus.

11. A non-transitory computer readable storage medium storing a program for causing a computer to execute a method executed by a server apparatus, the method comprising:

acquiring a request for updating setting information;

updating, based on the request, the setting information stored in a nonvolatile storage device of the server apparatus;

deleting identification information for identifying a client apparatus from an identification information list in a case where the setting information stored in the non-volatile storage device of the server apparatus is updated;

receiving, from a client apparatus, an updated data acquisition request for acquisition of the updated data on the setting information about the client apparatus that is stored in the non-volatile storage device of the server apparatus;

determining whether or not identification information for identifying the client apparatus that transmitted the updated data acquisition request is included in the identification information list;

transmitting, to the client apparatus, a first response indicating that the updated data does not exist without accessing the non-volatile storage device in a case where it is determined that the identification information for identifying the client apparatus that transmitted the updated data acquisition request is included in the identification information list;

transmitting, to the client apparatus, a second response including updated data obtained by accessing the non-volatile storage device in a case where it is determined that the identification information for identifying the client apparatus that transmitted the updated data acquisition request is not included in the identification information list; and adding the identification information for identifying the client apparatus that transmitted the updated data acquisition request for the updated data stored in the non-volatile storage device of the server apparatus to the identification information list in a case where the second response is transmitted.

12. The non-transitory computer readable storage medium according to claim 11, wherein the determination of whether the identification information for identifying the client apparatus that transmitted the updated data acquisition request is included in the identification information list is made further based on a data type designated by the client apparatus.

13. The non-transitory computer readable storage medium according to claim 11, wherein the determination of whether the identification information for identifying the client apparatus that transmitted the updated data acquisition request is included in the identification information list is made further based on a user designated by the client apparatus.

14. The non-transitory computer readable storage medium according to claim 11, wherein the non-volatile storage device is a hard disk drive (HDD).

15. The non-transitory computer readable storage medium according to claim 11, wherein the server apparatus is an image forming apparatus.

* * * * *